(12) United States Patent
Mannemann et al.

(10) Patent No.: US 7,134,299 B2
(45) Date of Patent: Nov. 14, 2006

(54) MELTDOWN DEVICE AS WELL AS A PROCESS FOR THE PRODUCTION OF HIGH-UV-TRANSMITTING GLASS TYPE

(75) Inventors: Karl Mannemann, Taunusstein (DE); Johann Faderl, Nieder-Hilbersheim (DE); Steffen Grün, Wallhausen (DE); Silke Wolff, Hückeswagen (DE)

(73) Assignee: Schott AG, Mainz (DE)

( * ) Notice: Subject to any disclaimer, the term of this patent is extended or adjusted under 35 U.S.C. 154(b) by 624 days.

(21) Appl. No.: 09/990,804

(22) Filed: Nov. 14, 2001

(65) Prior Publication Data

US 2002/0121114 A1    Sep. 5, 2002

(30) Foreign Application Priority Data

Nov. 17, 2000    (DE) ................................ 100 57 285

(51) Int. Cl.
*C03B 5/18*    (2006.01)
(52) U.S. Cl. .................... 65/135.3; 65/135.7; 65/29.19; 65/135.8; 65/162; 65/178
(58) Field of Classification Search ............... 65/135.3, 65/135.7, 178, 135.6, 29.19, 162; 373/27, 373/28; 502/902, 903, 905
See application file for complete search history.

(56) References Cited

U.S. PATENT DOCUMENTS 3,988,138 A * 10/1976 Rough ....................... 65/135.3
5,120,342 A    6/1992 Richards ...................... 65/178
5,320,985 A * 6/1994 Enomoto ...................... 501/57

FOREIGN PATENT DOCUMENTS

| EP | 0 526 583 | 8/1955 |
| GB | 2 265 618 | 10/1993 |
| JP | 0 225 2626 | 10/1990 |
| WO | WO 95/32026 | 11/1995 |

* cited by examiner

*Primary Examiner*—Mark Halpern
(74) *Attorney, Agent, or Firm*—Baker & Daniels

(57) ABSTRACT

The invention relates to a meltdown device for the production of high-UV transmittive glass types, comprising
 a meltdown tank for a melt bath
 a feed opening for the supplying or laying-in of highly pure raw material for the melt bath
 a draw-off opening for the drawing-off of material melted in the melt tank
 a cover arranged above the melt tank, in which
 the infeed opening to the melt tank is arranged above the melt bath in the region of the cover
 the draw-off opening is arranged in the zone of the bottom of the melt tank
 a heating arrangement.

Figure 1:
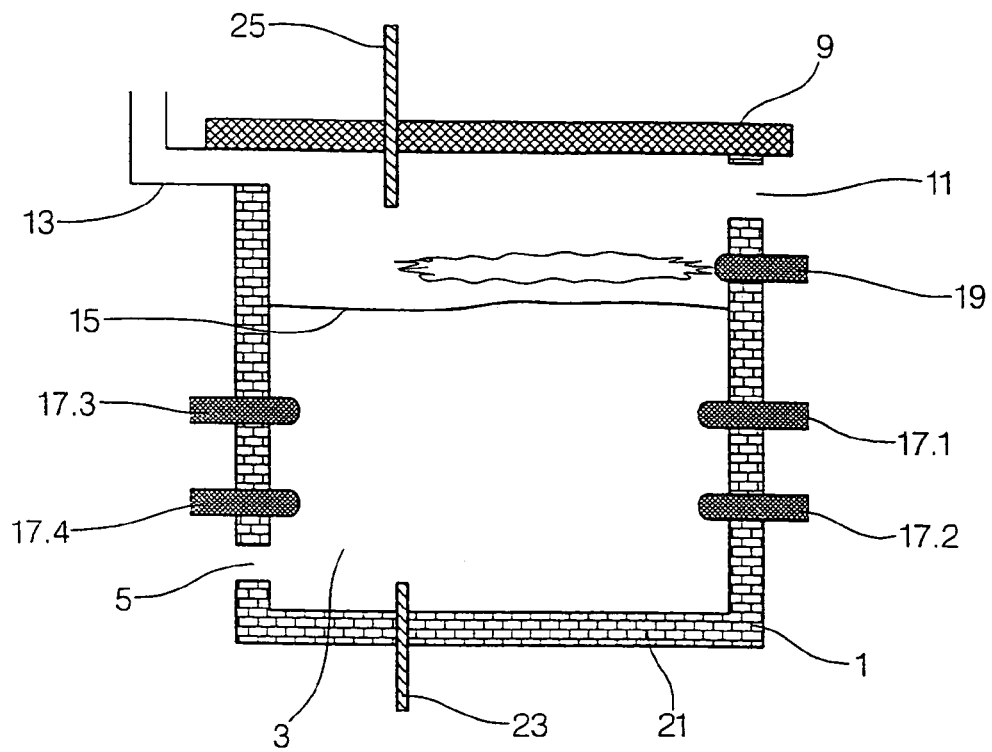

The heating arrangement comprises heating elements, in particular electrodes that are arranged on the melt tank in the zone of the melt bath, as well as an agitating arrangement for stirring of the melt bath and uniform intermixing and sub-mixing into the melt of material from the mixture lying on the melt surface.

10 Claims, 2 Drawing Sheets

PRIOR ART

MELTDOWN DEVICE AS WELL AS A PROCESS FOR THE PRODUCTION OF HIGH-UV-TRANSMITTING GLASS TYPE

This application claims priority for application 100 57 285.5 filed in Germany on 17 Nov. 2000.

The invention relates to a meltdown device for the production of high-UV-transmitting glass types, with a meltdown tank for a melting bath, a feed opening for the feeding or laying-in of highly pure raw material for the melting bath, a draw-off opening for the molten material in the melting tank, a cover arranged above the melting tank and a heating device. Further, the invention relates to a process for the production of high-UV-transmitting glass types.

The production of homogeneous optical glass types takes place at present with the aid of a meltdown device which comprises a meltdown tank, a feed opening as well as a lead-off opening, and a cover or a vaulting arranged above the melting tank.

The energy input into the melt occurs, in the first place, by direct heating of the melt, for example with electrodes, and, in the second place, by burners that fire the surface of the melt.

For the production of homogeneous optical glass types according to the state of the art, a well homogenized mixture of highly pure raw material is applied through the lay-in opening onto the surface of the melt. In the feeding-in of the raw materials care is taken that this operation takes place in such manner that no closed mixture cover is generated, since a closed mixture cover stands opposed to a good refraction value homogeneity if the optical glass, as is usual in the state of the art, is melted down without homogenization by an agitator. The energy feed occurs, in the first place, directly into the melt, for example with the aid of electrodes, in the second place, in the process according to the state of the art and the known processes, the meltdown device is fired with the aid of burners arranged above the melt surface. There the energy input of the two heating devices, namely the energy input directly into the melt and the energy input by means of the firing above the melt surface, is controlled over the temperature measuring devices that are arranged in the bottom of the melt tank and in the vaulting or the cover, in such manner that the temperature of the cover or vaulting corresponds about to the bottom temperature. The temperature of the vaulting amounts approximately to 1300° C., and that of the bottom to approximately 1350° C.

By the relatively homogenous temperature distribution in the meltdown device there is ensured a uniform melting-off of the mixture. This leads to a good optical homogeneity of the molten material. The melted-down material passes through a draw-off opening or through an overflow, over the platinum tube system, into the refining chamber.

The glass melted down with the meltdown device according to the state of the art shows an excellent homogeneity, but a clearly lowered transmission, especially in the UV range.

The low UV transmission, however, is disadvantageous for the use of such glass types, for example, in the field of telecommunication, of microlithography, or in high-power projection, for example in high-power r-LCD or t-LCD projection. This is an especially grave matter with lead-containing glass families with relatively high absorption in the UV range already caused by the lead constituent.

In particular, lacking sufficient UV transmission of lead-containing glass has prevented an application in the field of reflective liquid crystal displays (r-LCD), although these glass types would be excellently suited for such an application with a view to the very low voltage-optical coefficients.

The problem of the present invention, therefore, is making available of a new type meltdown device as well as a novel melting process for optical glass types, which permits the production of glass types with high transmission in the UV range. As stated earlier, the melting processes known at present are capable of making such glass types available.

Since such glass types can be used in many fields besides that of the r-LCD technology, for example in the field of telecommunications, especially in glass fibers and fiber re-enforcers as well as in microlithography, especially with HL objectives, it is necessary that the new-type process and the new type meltdown device have a high flexibility in respect to the meltable types of glass. Further, it is necessary that the glass types have a very high homogeneity, which corresponds at least to the homogeneity of the glass types at present melted down with conventional processes.

Further, the new-type device and the new-type processes must be constructed simpler that the hitherto known devices.

According to the invention the problem is solved by the means that in a meltdown device according to the state of the art the heating arrangement comprises exclusively heating elements, for example electrodes, that are arranged in the zone of the melting bath and, further, an agitating device for the stirring of the melt bath. Preferably, the melting tank is a circular crucible into which the agitator is installed centrally. The agitator comprises, in a preferred form of execution, three sections: a first section which is guided centrally into the melting crucible, a second section that is continued at a 90° angle just below the melt surface, and a third section which is led down at about two thirds of the outer radius of the melting crucible, again at a 90° angle. Such a design of the agitator provides for a uniform intermixing and submixing into the melt of the material from the mixture resting on the melt surface.

For temperature control and temperature management, measuring devices can be located both in the bottom and in the vaulting.

Besides the device, the invention makes available also a process for the production of glass types with high transmission the UV range. The process is distinguished in that a well homogenized mixture of highly pure glass material is fed in in such manner that on the melt surface a closed mixture cover is formed, energy is supplied exclusively in the zone of the glass melt and the glass melt is stirred already during the melting-in.

The inventors have perceived, surprisingly, that in the inventive process the melting-in can be accelerated during the melting in without there arising any of the disadvantages normally associated with the stirring. In the inventive process, accordingly, it is especially avoided that the crucible material is stressed by mixture particles, since according to the invention the stirring occurs only under the mixture cover.

The process of the invention can be used for the production of lead-containing (Pb) glass types with a much improved UV transmission, as well as for the production of conventional glass types with improved UV transmission.

The invention is to be described in the following, by way of examples, with the aid of the figures.

Figure 2:
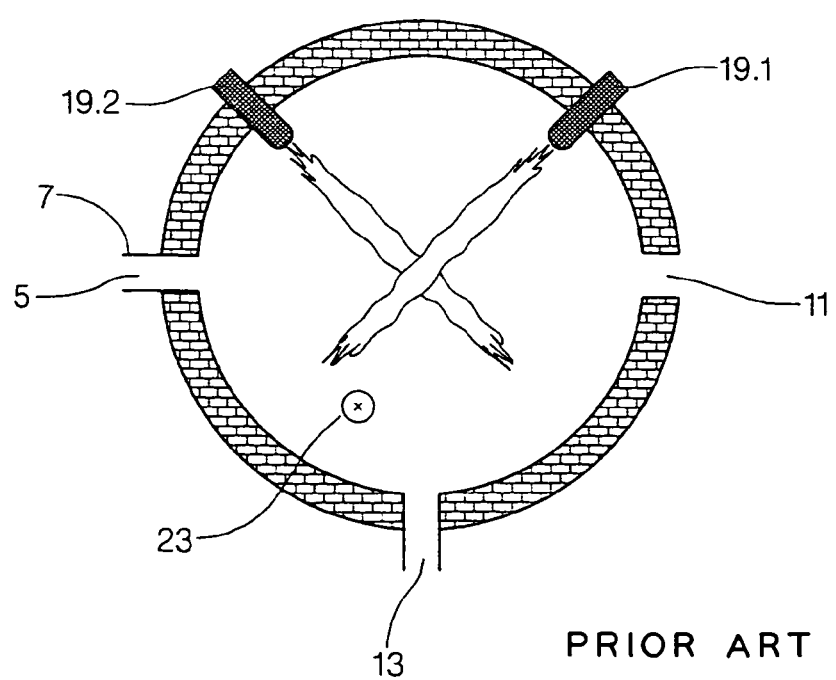
Figure 3:
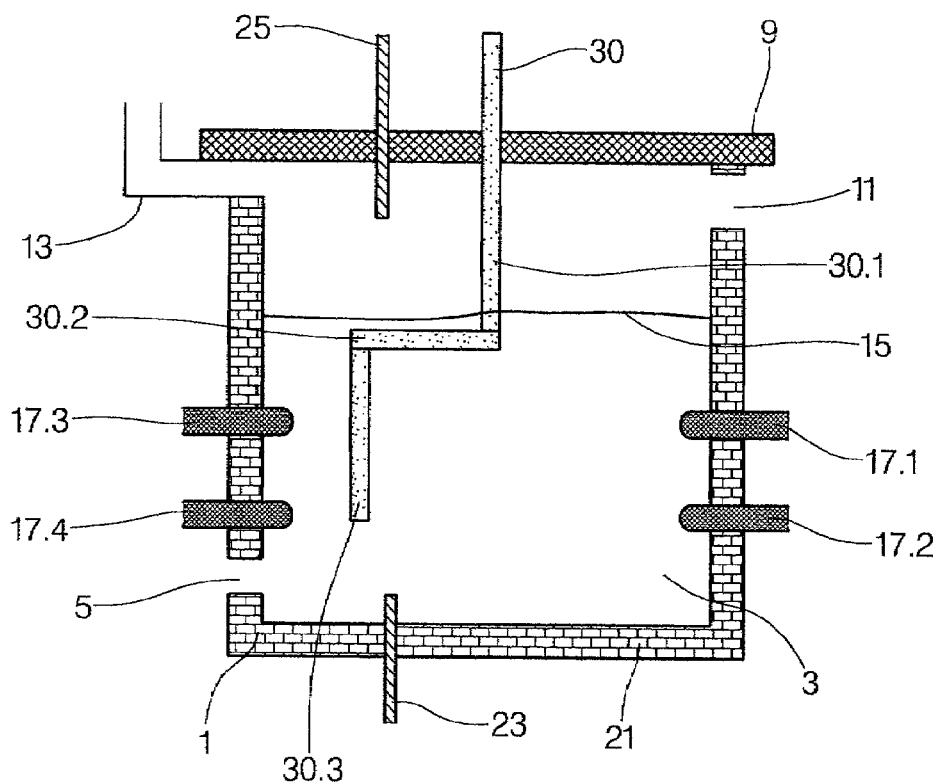
Figure 4:
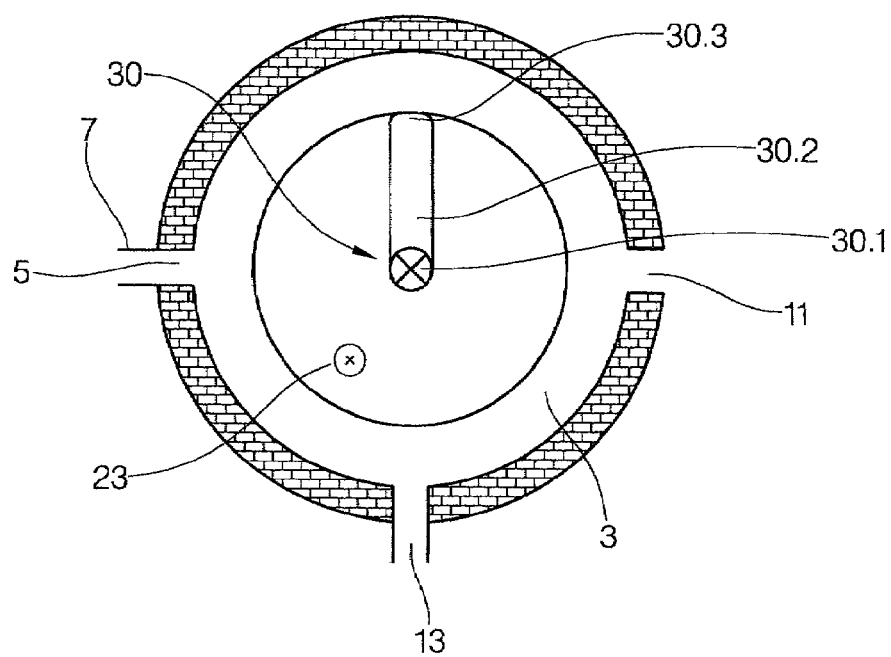

In the figures:

FIG. 1 shows a meltdown device according to the state of the art, in section view FIG. 2 a plan view of meltdown device according to the state of the art FIG. 3 a meltdown device according to the invention FIG. 4 a plan view of a meltdown device according to the invention.

FIG. 1 shows a cross section through a melt down tank according to the state of the art, which tank is used in a 3-basin continuous melting aggregate for small melt volumes. From the meltdown tank 1 the melted mixture or glass 3 passes over the draw-off opening 5 and a platinum tube system 7 to the refining chamber (not shown), from there into the unrepresented agitating crucible and then into a feed with subsequent thermal shaping. The throughput of such a device is about 150 to 200 kg/hr. The meltdown device according to the state of the art comprises, besides the meltdown tank 1, a cover 9 as well as a feed opening 11 and a chimney 13.

The glass melt 13 has a melt surface 15 onto which highly pure raw material is applied either in portions or continuously through the feed or lay-in opening 11. According to the state of the art no closed mixture cover is generated here. The melting process proper is heated by the 2×4 electrodes 17.1, 17.2, 17.3, and 17.4 arranged underneath the melt surface; furthermore the surface 15 of the melt 3 is fired by two angularly arranged burners 19. There the respective energy input of the two heating devices, namely of the electrodes 17.1, 17.2, 17.3, and 17.4 as well as the burner 19, is electronically generated over the thermal elements 23, 25 arranged in the cover of the vaulting 9 and at the bottom 21 of the melting tank in such manner that the temperature in the region of the vaulting corresponds, at approximately 1300° C., with the level of the bottom temperature, at approximately 1350° C. This guarantees the uniform melting-down of the mixture and therewith the optical homogeneity of the material. In FIG. 2 there is shown a plan view of a device according to the state of the art.

Clearly to be recognized: the two gas burners 19.1 and 19.2 mounted offset to one another as well as the thermal element 23 mounted on the bottom 21, the chimney 13, the feed opening 11 as well as the lead-off opening 5 to the refining channel 7.

In FIG. 3 a device according to the invention is represented. Like components as in the device according to the state of the art are indicated with the same reference numbers as in FIGS. 1 and 2.

FIG. 3 shows a cross section through the inventive new-type meltdown tank construction. In contrast to the device according to the state of the art, the device according to the invention has means for the energy input exclusively directly in the melt 3, i.e. underneath the melt surface 15. The energy input takes place exclusively through the 2×4 electrodes 17.1, 17.2, 17.3 and 17.4. Neither the cover 9 or vaulting, nor the melt surface 15 is heated, for example fired. Thereby a cold superstructure or a cold vaulting is generated. The temperatures above the melt surface 15 amount to ca. 500 to 700° C.

Further, through the feed opening 11 a well homogenized mixture is fed in such manner that the fed-in raw material is distributed uniformly on the melt surface 15 and a closed mixture cover is generated. In the process according to the state of the art a closed mixture cover would stand in the way of a rapid melting down as well as of a good refraction value homogeneity, since in the process according to the state of the art the melting down is accomplished by an agitator without homogenization.

The device according to the invention, in contrast, has an agitator 30. The agitator 30 comprises a first section 30.1 which is mounted centrally in the meltdown tank 1, a second section 30.2 which is connected to the first section at a 90° angle closely underneath the melt surface 15 as well as a third section which is moved downward at about two thirds of the outer radius of the meltdown tank 1, again at a 90° angle. Such a construction of the agitator guarantees the uniform intermixing and sub-mixing into the melt of material from the mixture resting on the melt surface 15 in a closed mixture cover, and therewith the uniform melting-off despite the closed mixture cover. The absent firing of the vaulting brings about altogether a lower temperature of approximately 1250° C. in the melt basin. The closed mixture cover prevents the inhomogeneous lowering of the temperature upward to the cold superstructure. By reason of the absent firing of the melt surface 15, the energy input into the new-type melt device is considerably less; simultaneously with the new-type process under the novel meltdown device the UV transmission of the molten glass types and in the case of the SF glass types in addition, the fluorescence properties are dramatically improved. The optical homogeneity of a device according to FIG. 3, according to the earlier-described glass, corresponds to that of a glass which is produced in the usual process course in a device according to the state of the art.

In FIG. 4 there is known a plan view of the inventive novel melting device. Like components are marked with the same reference numbers as those in FIG. 3. Especially to be recognized is the agitator 30 with the first section 30.1, the second section 30.2 and the third section 30.3.

In the following there will be presented examples of execution of glass types produces with the aid of the process of the invention in the device according to the invention, from which it is evident that the glass types obtained in this way are superior to the glass types produced according to conventional processes in respect to the UV transmission.

In Table 1 the compositions of the glass types are given in % by weight for the comparative tests of glass types produced in a conventional manner in comparison to glass types produced according to the process of the invention.

TABLE 1

Composition of the investigated glass types

| Component | Glass 1 | Glass 2 | Glass 3 | Glass 4 |
|---|---|---|---|---|
| $Si_2$ | 24.4 | 61.2 | 52.15 | 45.75 |
| PbO | 74.3 | 25.7 | 34.05 | 45.20 |
| $Na_2O$ | 0.4 | 4.8 | 6.6 | 3.7 |
| $K_2O$ | 0.6 | 8.2 | 7.0 | 5.1 |
| $As_2O_3$ | 0.3 | 0.2 | 0.25 | 0.05 |
| $N^d$ | 1.84666 | 1.54814 | 1.548144 | 1.62004 |
| $V_d$ | 23.83 | 45.75 | 40.85 | 36.37 |

Here $N_d$ designates the refraction index and $V_d$ the Abbe coefficient of the glass.

In table 2 there are presented the melt parameters for glass types produced according to the conventional process, and in comparison to this the glass types produced according to the process of the invention.

TABLE 2

Melt parameters

| Glass type | Burner $m^3/hr$ | T-vaulting ° C. | T-melt ° C. | SW agitator rpm |
|---|---|---|---|---|
| Glass 1 | 6 | 1020 | 960 | — |
| Glass 1 HT | — | 780 | 960 | 5 |
| Glass 2 | 16 | 1350 | 1300 | — |

TABLE 2-continued

| Glass type | Melt parameters | | | |
|---|---|---|---|---|
| | Burner m³/hr | T-vaulting °C. | T-melt °C. | SW agitator rpm |
| Glass 2 HT | — | 1050 | 1300 | 5 |
| Glass 3 | 12 | 1320 | 1280 | — |
| Glass 3 HT | — | 1050 | 1280 | 5 |
| Glass 4 | 10 | 1280 | 1250 | — |
| Glass 4 HT | — | 1000 | 1250 | 5 |

Table 3 gives the pure-transmission degree of the glass produced for different types, namely of the conventional glass types and of the glass types produced according to the invention.

TABLE 3

| | Pure-transmission degree Wavelength [nm] - Pure-transmission (100 mm layer thickness) | | | | |
|---|---|---|---|---|---|
| Glass type | 365 | 380 | 390 | 400 | 520 |
| Glass 1 | | | | 14 | 42 | 76 |
| Glass 1 HT | | | | 21 | 53 | 83 |
| Glass 2 | 94 | 97 | 98 | 98.5 | |
| Glass 2 HT | 97 | 98 | 98.7 | 99 | |
| Glass 3 | 92 | 96.5 | 97.8 | 98.4 | |
| Glass 3 HT | 96.5 | 98.3 | 98.8 | 99.1 | |
| Glass 4 | 77 | 91 | 94 | 96 | |
| Glass 4 HT | 87 | 95 | 96.8 | 98 | |

In Tables 2 and 3 the glass types that are produced according to the conventional process are indicated without additive and those according to the new process are characterized with HT. Further, the fuel gas consumption is given in the old process and the agitator rate of rotation in the new process is given, in order to make the differences clear. The eliminated fuel gas consumption makes up a large part of the energy-saving potential of the glass types processes according to the new process, besides the lower temperatures, as well as the improved transmission values.

In the following Table 4, the composition ranges in percent by weight, above all, of the Flint and Light Flint (Leichtflint) types:

TABLE 4

| Component | Range |
|---|---|
| $SiO_2$ | 19–67 |
| PbO | 20–80 |
| $Na_2O$ | 0–9 |
| $K_2O$ | 0–10.5 |
| $As_2O_3$ | 0.1 |

The following ranges are preferred:

TABLE 5

| Component | Ranges | | |
|---|---|---|---|
| $SiO_2$ | 40–67 | 40–58 | 47–67 |
| PbO | 20–51 | 29–51 | 20–39 |
| $Na_2O$ | 1.5–9 | 1.5–9 | 2–9 |
| $K_2O$ | 3–10.5 | 3–9 | 2–9 |
| $As_2O_3$ | 0–1 | 0–1 | 0–1 |

The composition ranges of the glass 1, glass 2, glass 3 and glass 4 glass types preferably of the Flint, Light Fling types, is given in percent by weight, by way of example in the following Table 6:

TABLE 6

| Component | Glass Type | | | |
|---|---|---|---|---|
| | Glass 1 | Glass 2 | Glass 3 | Glass 4 |
| $SiO_2$ | 19–30 | 55–67 | 47–58 | 40–51 |
| PbO | 69–80 | 20–31 | 29–39 | 40–51 |
| $Na_2O$ | 0–2.5 | 2–7 | 4.5–9 | 1.5–6 |
| $K_2O$ | 0–2.5 | 6–10.5 | 5–9 | 3–7 |
| $As_2O_3$ | 0–1 | 0–1 | 0–1 | 0–1 |

With the process of the invention there can also be melted down a still larger number of further glass types. Only as example(s) for such glass compositions there are to be mentioned glass types according to Table 7.

TABLE 7

| Further glass compositions contain, for example, Ba, and do not contain Pb | |
|---|---|
| Component | Glass type |
| $SiO_2$ | 25–70 |
| $B_2O_3$ | 2–12 |
| $Al_2O_3$ | 0–4 |
| $Na_2O$ | 0–11 |
| $K_2O$ | 0–10 |
| CaO | 0–10 |
| BaO | 3–45 |
| ZnO | 0–20 |
| $TiO_2$ | 1–12 |
| $ZrO_2$ | 0–7 |
| $Sb_2O_3$ | 0–1 |

The following ranges are preferred:

TABLE 8

| Component | Glass type | |
|---|---|---|
| $SiO_2$ | 25–60 | 45–70 |
| $B_2O_3$ | 3–12 | 2–12 |
| $Al_2O_3$ | 0–4 | |
| $Li_2O$ | | |
| $Na_2O$ | 0–9 | 1–11 |
| $K_2O$ | 0–8 | 3–10 |
| MgO | | |
| CaO | 0–10 | |
| BaO | 8–45 | 3–22 |
| SrO | | |
| ZnO | 0–9 | 0–20 |
| $TiO_2$ | 3–12 | 1–7 |
| $ZrO_2$ | 0–7 | 0–2 |
| $Sb_2O_3$ | 0–1 | 0–1 |

With the device according to the invention and the process according to the invention, there is given for the first time a possibility of melting different glass types under agitation, without the disadvantages associated with the agitating occurring. Hereby the energy input is minimized, the melting process accelerated and higher-transmittive glass types are obtained in the UV ranges.

The invention claimed is:

1. A process for the production of glasses highly transmittive in the UV range by means of a melting process carried out in a melt tank in which there is a glass melt having a melt surface, comprising:

steadily feeding a well-homogenized mixture of highly pure glass raw materials of the highly transmittive glasses to be melted through a feed opening of the melt tank in such a manner that a closed mixture cover arises on the melt surface; supplying energy to the glass melt only below the melt surface without supplying energy to the melt surface or the space above the melt surface; and agitating the melt;

wherein material from the mixture resting on the melt surface is uniformly intermixed and sub-mixed into the melt, and wherein the space above the melt has a temperature in the range of 500° C. to 700° C.

2. The process according to claim 1 wherein the highly transmittive glasses are Flint glass types with an Abbe coefficient of $V_d \leq 50$.

3. The process according to claim 2, wherein feeding-in of the highly pure glass raw materials occurs either in portions or continuously.

4. The process according to claim 2, wherein the temperature in the melt lies in the range of 1100° to 1380° C.

5. The process according to claim 2, wherein agitation of the melt comprises stirring at a rotation rate in the range of 30 to 100 rpm.

6. The process according to claim 1 wherein feeding in of the highly pure glass raw materials occurs either in portions or continuously.

7. The process according to claim 6, wherein the temperature in the melt lies in the range of 1100° to 1380° C.

8. The process according to claim 1 wherein the temperature in the melt lies in the range of 1100° to 1380° C.

9. The process according to claim 1 wherein agitation of the melt comprises stirring at a rotation rate in the range of 30 to 100 rpm.

10. The process according to claim 1 wherein the temperature in the melt lies in the range of 1280° C. to 1380° C.

* * * * *